(12) United States Patent
Todd

(10) Patent No.: US 8,066,602 B2
(45) Date of Patent: Nov. 29, 2011

(54) TENSION-REDUCING RANDOM SPROCKET

(75) Inventor: Kevin B. Todd, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 10 days.

(21) Appl. No.: 12/642,113

(22) Filed: Dec. 18, 2009

(65) Prior Publication Data

US 2010/0151978 A1    Jun. 17, 2010

Related U.S. Application Data

(63) Continuation of application No. 11/456,496, filed on Jul. 10, 2006, now Pat. No. 7,654,925, which is a continuation-in-part of application No. 09/993,531, filed on Nov. 6, 2001, now Pat. No. 7,125,356.

(51) Int. Cl.
*F16H 55/30* (2006.01)
*F16H 7/06* (2006.01)

(52) U.S. Cl. .......... 474/152; 474/156; 474/160

(58) Field of Classification Search .......... 474/148, 474/152–153, 156–157, 160, 202, 206, 212–213; 74/437; D12/110, 114, 123
See application file for complete search history.

(56) References Cited

U.S. PATENT DOCUMENTS

| | | |
|---|---|---|
| 515,449 A | 2/1894 | Scovell |
| 530,058 A | 11/1894 | Schaum et al. |
| 571,086 A | 11/1896 | Fulton et al. |
| 596,289 A | 12/1897 | Smith |
| 611,170 A | 9/1898 | Howard |
| 613,756 A | 11/1898 | Buddle |
| 1,650,449 A | 11/1927 | Jaeger |
| 1,936,117 A | 11/1933 | Peschl |
| 1,963,314 A | 6/1934 | Savell et al. |
| 2,344,757 A | 3/1944 | Weisberger |
| 2,477,441 A | 7/1949 | Cole |
| 2,941,413 A | 6/1960 | Huber et al. |
| 3,583,250 A | 6/1971 | Kongelka |
| 3,752,035 A | 8/1973 | Cozzy et al. |
| 3,752,601 A | 8/1973 | Karagozian et al. |
| 3,830,212 A | 8/1974 | Seino et al. |
| 3,858,454 A | 1/1975 | Duff |

(Continued)

FOREIGN PATENT DOCUMENTS

DE    2 014 537 A1    10/1970

(Continued)

OTHER PUBLICATIONS

Study on Timing Belt Noise (How to Reduce Resonant Noise) Conference Title: Proceedings of the 1989 International Power Transmission and Gearing Conference: New Technologies for Power Transmissions of the 90's; Chicago, Illinois, Apr. 25, 1989, 9 pages.

(Continued)

*Primary Examiner* — Marcus Charles
(74) *Attorney, Agent, or Firm* — Brown & Michaels, PC

(57) ABSTRACT

A sprocket is provided having a plurality of teeth around its circumference. Adjacent teeth are separated by roots each having a root radius defined as the distance between the center of the sprocket and a point along the root closest to the sprocket center in a radial direction. In one aspect of the invention, the sprocket comprises at least two different root radii arranged in a pattern effective to redistribute tensions imparted to a chain by the sprocket at one or more predetermined sprocket orders.

22 Claims, 5 Drawing Sheets

U.S. PATENT DOCUMENTS

| | | |
|---|---|---|
| 3,899,932 A | 8/1975 | Durham |
| 4,036,071 A | 7/1977 | McKnight et al. |
| 4,168,634 A | 9/1979 | Griffel |
| 4,181,034 A | 1/1980 | Daniel |
| 4,193,324 A | 3/1980 | Marc |
| 4,337,056 A | 6/1982 | Bruns |
| 4,504,074 A | 3/1985 | Smith |
| 4,515,577 A | 5/1985 | Cathey et al. |
| 4,522,610 A | 6/1985 | Nagano |
| 4,526,558 A | 7/1985 | Durham |
| 4,810,237 A | 3/1989 | Mantovaara |
| 4,865,577 A | 9/1989 | Freudenstein |
| 4,913,684 A | 4/1990 | Mantovaara et al. |
| 4,915,598 A | 4/1990 | Kubis |
| 4,936,812 A | 6/1990 | Redmond |
| 5,267,910 A | 12/1993 | Maruyama et al. |
| 5,394,282 A | 2/1995 | Wada |
| 5,397,280 A | 3/1995 | Skurka |
| 5,427,580 A | 6/1995 | Ledvina et al. |
| 5,437,581 A | 8/1995 | Ledvina et al. |
| 5,453,059 A | 9/1995 | Avramidis et al. |
| 5,490,282 A | 2/1996 | Dreps et al. |
| 5,492,390 A | 2/1996 | Kugelmann, Sr. |
| 5,549,314 A | 8/1996 | Sassi et al. |
| 5,551,925 A | 9/1996 | Mott et al. |
| 5,562,557 A | 10/1996 | Ledvina et al. |
| 5,611,744 A | 3/1997 | Shen |
| 5,628,702 A | 5/1997 | Kotera |
| 5,683,319 A | 11/1997 | Mott et al. |
| 5,772,546 A | 6/1998 | Warszewski |
| 5,816,967 A | 10/1998 | Ledvina et al. |
| 5,846,149 A | 12/1998 | Ledvina et al. |
| 5,876,295 A | 3/1999 | Young |
| 5,882,025 A | 3/1999 | Runnels |
| 5,935,046 A | 8/1999 | Maresh |
| 5,971,721 A | 10/1999 | Carstensen |
| 5,976,045 A | 11/1999 | Young |
| 6,019,692 A | 2/2000 | Kojima et al. |
| 6,050,916 A | 4/2000 | Hunkert |
| 6,155,943 A | 12/2000 | Ledvina et al. |
| 6,189,639 B1 | 2/2001 | Fuse et al. |
| 6,213,905 B1 | 4/2001 | White et al. |
| 6,736,744 B1 | 5/2004 | Wigsten et al. |
| 7,125,356 B2 | 10/2006 | Todd |
| 7,654,925 B2 | 2/2010 | Todd |
| 2001/0023212 A1 | 9/2001 | Horie et al. |
| 2002/0142873 A1 | 10/2002 | Oser |
| 2002/0169043 A1 | 11/2002 | Liu |
| 2003/0104886 A1 | 6/2003 | Gajewski |

FOREIGN PATENT DOCUMENTS

| | | |
|---|---|---|
| DE | 2 338 865 A1 | 2/1974 |
| DE | 37 39 336 A1 | 6/1989 |
| DE | 43 16 877 A1 | 11/1993 |
| DE | 43 31 482 A1 | 3/1994 |
| DE | 42 41 231 A1 | 6/1994 |
| DE | 195 20 508 A1 | 12/1996 |
| DE | 196 49 397 A1 | 6/1998 |
| DE | 198 12 939 A1 | 1/1999 |
| DE | 200 08 042 U1 | 8/2000 |
| EP | 0 066 294 A1 | 12/1982 |
| EP | 1 448 916 B1 | 8/2006 |
| GB | 1175505 A | 12/1969 |
| JP | 63-67452 A2 | 3/1988 |
| JP | 63-88368 A | 4/1988 |
| JP | 63-97830 A | 4/1988 |
| JP | 63-106453 A | 5/1988 |
| JP | 63-145858 A | 6/1988 |
| JP | 1-95538 U | 6/1989 |
| JP | 1-244116 A | 9/1989 |
| JP | 1-288657 A | 11/1989 |
| JP | 63-118439 A | 11/1989 |
| JP | H3-107654 A | 5/1991 |
| JP | 3-297792 A | 12/1991 |
| JP | 4-39444 A | 2/1992 |
| JP | 4-165148 A | 6/1992 |
| JP | 5-86892 A | 4/1993 |
| JP | 5-164191 A | 6/1993 |
| JP | 6-162635 A | 6/1994 |
| JP | 61-59037 A | 6/1994 |
| JP | 6-239284 A | 8/1994 |
| JP | 8-14058 A | 1/1996 |
| JP | 10-176506 A | 6/1998 |
| JP | 10-266814 A | 10/1998 |
| JP | 10-266868 A | 10/1998 |
| JP | 10-274052 A | 10/1998 |
| JP | 2001-304374 A | 10/2001 |
| JP | 2001-348809 A | 12/2001 |
| JP | 2001-349416 A | 12/2001 |
| WO | 98/29673 A2 | 7/1998 |

OTHER PUBLICATIONS

Analysis of Nonlinear Vibration of Timing Belt: (Under Meshing Impact and Varying Tension by Eccentric Pulley) Authors: Shaochang Li; Hideyuki Otaki; Keiichi Watanuki; Conference Title: Proceedings of the 1995 Joint ASME/JSME Pressure Vessels and Piping Conference, 9 pages.

Vibration and Control of Axially Moving Belt System, 1st Report, Experimental Analysis; Authors: Takano Koetsu; Keiji Watanabe; Osami Matsushita; Masanori Kitano; Nippon Kikai Gakkai Ronbunshu. C (Transactions of the Japan Society of Mechanical Engineers, C), 1998, vol. 64, No. 618, pp. 421-428, Fig. 20, Tbl. 6, Ref. 8, with English Translation, 36 pages.

Vibration and Control of Axially Moving Belt System, 3rd Report, Analysis by Parametric Excitation; Authors: Hiroki Okubo; Koetsu Takano; Osami Matsushita, Keiji Watanabe, Yoshi Hirase; Nippon Kikai Gakkai Ronbunshu. C (Transactions of the Japan Society of Mechanical Engineers. C), 1999, vol. 65, No. 635, pp. 2706-2712, with English Translation, 34 pages.

Life Analysis of Water Pump Bearing for Cars Considering Shaft Rigidity; Authors: Masaaki Sakuragi; Shigeo Kamamoto; Koyo Eng J, 1989, No. 136, pp. 51-63 (English Abstract only), 1 page.

Analysis of Nonlinear Oscillations of the Timing Belt (1st Report, Regions of Resonance of the Timing Belt); Authors: Shao-chang Li, Hideyuki Otaki, Yoshio Ishikawa, Keiichi Watanuki; Nippon Kikai Gakkai Ronbunshu, C Hen/Transactions of the Japan Society of Mechanical Engineers, Part C, 1993, vol. 59, No. 568, Dec. 1993, pp. 3902-3906 (English Abstract only), 1 page.

Parametric Excitation of Timing Belt; Author: Eiki Osaki; Nippon Hakuyo Kikan Gakkaishi (Journal of the Marine Engineering Society in japan); 1993, vol. 28, No. 5, pp. 320-325 (English Abstract only), 1 page.

Audible Noise Produced by the Sporadic Changes of Tensile Forces in a Belt Driven System; Author: C. Ozturk; Journal of Low Frequency Noise & Vibration; 1995, vol. 14, No. 4, pp. 193-211 (English Abstract only), 1 page.

Vibration of Timing Belt Subjected to Fluctuations of Tension; Authors: Eiki Osaki, Yoshihiro Miyoshi; Katsuyuki Koga; Journal of National Fisheries University; 1996, vol. 45, No. 2, pp. 79-85 (English Abstract only), 1 page.

Vibration and Control of Axially Moving Belt System. Effect of Inclined Angle; Authors: Yoshi Hirase; Kouetsu Takano; Hiroki Okubo; Osami Matsushita; Keiji Watanabe. Nippon Kikai Gakkai Kikai Rikigaku, Keisoku Seigyo Koen Ronbunshu, 1998, vol. 1998, No. B, pp. 317-320 (English Abstract only), 1 page.

Vibration and Control of Axially Moving Belt System (Effect of Inclined Angle by Theory and Experiment); Authors: Yoshi Hirase; Kouetsu Takano; Hiroki Okubo; Osami Matsushita; Keiji Watanabe. Nippon Kikai Gakkai Kikai Rikigaku, Keisoku Seigyo Koen Ronbunshu, 1999, vol. 1999, No. A, pp. 443-446 (English Abstract only), 1 page.

Study on a Servo Control System Using Timing Belt Drives; Authors: H. Lee, Tatsuaki Masutomi, Naoyuki Takesue, Masamichi Sakaguchi, Junji Furusho, Hideaki Tanaka; Proceedings of the Annual Conference of the Institute of Systems Control and Information Engineers, 2000, vol. 44th, pp. 625-626 (English Abstract only), 1 page.

Vibration and Control of Axially Moving Belt System. 4th Report. Effect of Inclined Angle by Experiment; Authors: Koetsu Takano; Yoshi Hirase; Hiroki Okubo; Osami Matsushita; Keiji Watanabe;

Nippon Kikai Gakkai Ronbunshu. C (Transactions of the Japan Society of Mechanical Engineers. C), 2000, vol. 66, No. 645, pp. 1439-1444 (English Abstract only), 1 page.

Vibration Induced in Driving Mechanism of Photoconductor Drum in Color Laser Printer; Authors: Hiroyuki Kawamoto; Yosuke Watanabe; Nippon Kikai Gakkai Kikai Rikigaku, Keisoku Seigyo Koen Ronbunshu, 2000, vol. 2000, No. Pt 4, pp. 1028-1031 (English Abstract only), 1 page.

Vibration and Control of Axially Moving Belt System: Analysis and Experiment by Parametric Excitation; Authors: H. Okubo; K. Takano; O. Matsushita; K. Watanabe; Y. Hirase; Journal of Vibration and Control, May 2000, vol. 6, No. 4, pp. 589-605.

Primary and Parametric Non-Linear Resonances of a Power Transmission Belt: Experimental and Theoretical Analysis; Authors: F. Pellicano; A. Fregloent; A. Bertuzzi; F. Vestroni; Journal of Sound and Vibration, Jul. 19, 2001, vol. 244, No. 4, pp. 669-684 (English Abstract only), 1 page.

Nonlinear Vibration Analysis of Running Viscoelastic Belts; Author: YS Choi; Proceedings of the 5th International Conference on Vibration Engineering; Nanjing, China, Sep. 18-20, 2002 (English Abstract only), 1 page.

Base and Application of Timing Belt, Primary Part 5. Rotation Transmitting Error (Case of No Load); Authors: Tomio Koyama; Masanori Kagotani; Kikai no Kenkyu (Science of Machine), 2003, vol. 55, No. 2, pp. 269-278 (English Abstract only), 1 page.

Parametric Instability of Belts: Theory and Experiments; Authors: F. Pellicano (Reprint); G. Catellani; A. Fregolent, Computers & Structures, Jan. 2004, vol. 82, No. 1, pp. 81-91 (English Abstract only), 1 page.

Vibration and Control of Axially Moving Belt System: Analysis and Experiment by Parametric Excitation; Authors: H. Okubo (Reprint); K. Takano; O. Matsushita; K. Watanabe; Y. Hirase; Journal of Vibration and Control, May 2000, vol. 6, No. 4, pp. 589-605 (English Abstract only), 1 page.

European Patent Office Search Report for European Patent Application No. 02257611, dated Dec. 6, 2004, 3 pages.

ORIGINAL RANDOM PATTERN PREDICTED ORDER CONTENT

TENSION-REDUCING RANDOM SPROCKET

CROSS-REFERENCE TO RELATED APPLICATION

This application is a continuation of prior application Ser. No. 11/456,496, filed Jul. 10, 2006 now U.S. Pat. No. 7,654,925, which is a continuation of prior application Ser. No. 09/993,531, filed Nov. 6, 2001, now U.S. Pat. No. 7,125,356 B2, which are hereby incorporated herein by reference in their entirety.

FIELD OF THE INVENTION

The invention relates generally to a sprocket, and particularly to a sprocket for reducing chain tensions.

BACKGROUND OF THE INVENTION

Chain and sprocket systems are often used in automotive engine systems to transmit rotational forces between shafts. For example, a sprocket on a driven shaft may be connected via a chain to a sprocket on an idler shaft. In such a chain and sprocket system, rotation of the driven shaft and driven sprocket will cause the rotation of the idler shaft and idler sprocket via the chain. In an automotive engine system, sprockets on the crankshaft may be used, for example, to drive one or more cam shaft sprockets.

The chains used in chain and sprocket systems typically comprise a plurality of intermeshing link plates connected with pins or rollers. The sprockets typically comprise a circular plate having a plurality of teeth disposed around the circumference thereof. Located between adjacent teeth are roots having generally arcuate or semi-circular profiles for receiving the pins or rollers of the chain. Each root has a root radius, defined as the distance from the center of the sprocket to a point on the root closest to the sprocket center.

In a "straight" sprocket the root radii are all substantially equal. However, it has been found that as a chain rotates around a straight sprocket, audible sound frequencies creating undesirable noise are often generated as the pins or rollers connecting the links of the chain contact the sprocket teeth and impact the roots disposed between adjacent teeth of the sprockets.

The sound frequencies and volume of such noise typically varies depending on the chain and sprocket designs, chain rotational speed, and other sound or noise sources in the operating environment. In the design of chain and sprocket systems, it can be desirable to reduce the noise levels generated as the rollers of a chain engage roots of a sprocket.

"Random" sprockets have been developed to help reduce the radiated noise levels generated by the engagement of the chains with the sprockets. Random sprockets may be characterized by having a plurality of different root radii. The different root radii can be arranged in a pattern around the sprocket circumference to modulate the sound frequencies generated by the engagement of the chain rollers or pins with sprocket teeth and roots. By modulating these sound frequencies, the noise generated as the chain rotates around the sprocket may be reduced.

In addition to minimizing noise generated by engagement between a chain and sprocket, it is also desirable to reduce the tensions imparted to the chain by the sprocket. Reduced chain tensions can be advantageous because they may result in decreased wear of the chain, thus increasing the life cycle of the chain. Furthermore, reduced chain tensions may also result in less wear to the sprocket, thereby also increasing the life cycle of the sprocket.

It has been observed in chain tension measurements that certain chain tensions in a particular system may vary on a periodic or repeating basis, which often can be correlated to tension inducing events. For example, in automotive timing chain systems, it has been observed from chain tension measurements that the engagement and disengagement of each sprocket tooth and/or root with the chain pins often results in repeating tension changes. These chain tension changes may be correlated with potentially tension inducing events, such as the firing of piston cylinders, transmission engagements, etc.

A useful approach to analyzing such tension events is to observe the number of events that occur relative to a reference time period, as well as the amount of the tension change for each event. For example, in an automotive timing chain system, one may observe the number or frequency of tension changes in the chain relative to rotations of a sprocket or a crankshaft, as well as the magnitude of the tension change in the chain.

In such a system, for example, a tensioning event that occurs once per shaft or sprocket rotation may be considered a "first" order event, and an event occurring four times for each shaft or sprocket rotation may be considered a "fourth" order event. Depending on the system and the relative reference period, i.e., rotations of the crankshaft or the sprocket (or another reference), there may be multiple "orders" of events in a crankshaft or sprocket rotation in such a system originating from one or more tension sources. Similarly, a particular order of the sprocket rotation may include or reflect the cumulative effect of more than one tensioning event. As used herein, such orders of tensioning events occurring during a sprocket (or crankshaft) rotation also may be referred to as the orders of a sprocket (or crankshaft) and/or sprocket orders (or crankshaft orders).

In straight sprockets, measurable tensions typically are imparted to the chain at a sprocket order corresponding to the number of teeth on the sprocket, also known as the pitch order. Thus, in a sprocket with nineteen teeth, tensions would be imparted to the chain at the nineteenth or pitch order, i.e., nineteen times per revolution of the sprocket. Depending on the sprocket design, the order in a straight sprocket would typically occur at equal intervals relative to the sprocket rotation, with a generally equal tension change or amplitude.

Random sprockets, in contrast, typically have different tensioning characteristics when compared to straight sprockets due to the different root radii. As the chain rotates around the random sprocket, each of the different root radii typically imparts a different tensioning event to the chain. For instance, as a roller of the chain engages a root having a first root radius, the chain may be imparted with a tension different from when a roller of the chain engages a root having a second root radius larger than the first root radius. Tension changes, in addition, may also be imparted to the chain by a random sprocket due to the relative positioning of the different root radii. A roller moving between adjacent roots having the same root radii may result in different chain tension changes than a roller moving between adjacent roots having different radii.

The change in chain tensions imparted by random sprockets may be further accentuated when the sprocket has more than two different root radii. In a random sprocket having first, second, and third successively larger root radii, the tension imparted to the chain may be greater when a chain roller moves from a root having a first root radii to a root having a third root radii than when a chain roller moves from a root having a first root radii to a root having a second root radii.

Thus, random sprockets designed principally for noise reduction often cause increases in chain tensions and tension changes as compared to the maximum tensions imparted to the chain by straight sprockets. For example, a random sprocket design may reduce chain noise or chain whine by reducing the pitch order of the sprocket. However, reducing the pitch order of a sprocket may result in redistributing or concentrating the tensional forces imparted to the chain by the sprocket over the lower orders of the sprocket. This often results in increased chain tensions corresponding to the lower orders of the random sprocket.

The increased chain tensions at the lower sprocket orders frequently cause the overall maximum chain tension force exerted on the chain and sprocket to increase. As a consequence, a chain and sprocket system subjected to such tensions typically will experience greater wear and increased opportunities for failure, as well as others adverse effects, due to the concentration of the tensional forces in the lower orders.

Accordingly, there remains a need for a sprocket design and method of designing sprockets that incorporates the noise reduction properties of random sprockets without the increased maximum chain tensions associated therewith. In addition, there is a need for a sprocket design and method for designing sprockets to provide the flexibility to shift tensional forces to different sprocket (or other) orders to enhance the performance, durability, and efficiency of a chain and sprocket system or other comparable systems.

SUMMARY OF THE INVENTION

In accordance with one aspect of the invention, a sprocket is provided that has a root pattern and root radii selected to concentrate the maximum chain tensions at a predetermined order or at multiple predetermined orders relative to the sprocket rotation or another reference, such as, for example, the rotation of a crankshaft in automatic timing chain applications. In this aspect, a sprocket is provided that promotes reduced or controlled chain tensions and may also simultaneously reduce chain noise.

In another important aspect, the order or orders of the sprocket having the concentrated chain tensions may be chosen to at least partially cancel or add to corresponding tensions imparted to the chain from sources external to the sprocket. By coordinating the maximum tensions imparted to the chain by the sprocket with the maximum or minimum tensions imparted to the chain by sources external to the sprocket, the overall maximum tensions in the system may be reduced or redistributed in a beneficial way.

In another important aspect of the invention, a sprocket is provided that has a random tooth pattern and root radii that are selected to concentrate the maximum chain tensions at a predetermined order of the sprocket (or other reference). The sprocket comprises a plurality of radially extending teeth arranged around the circumference of the sprocket. Roots are defined between adjacent teeth and have a generally concave or semi-circular profile for engagement with roller or pin connecting links of the chain. The roots each have a root radius measured from the center of the sprocket to a point along the root closest to the sprocket center in the radial direction.

In accordance with another aspect of the invention, the tooth pattern of the random sprocket may comprise two or more different root radii between adjacent teeth arranged in a predetermined pattern around the circumference of the sprocket effective to reduce the sound frequencies generated as the rollers of the chain engage the sprocket teeth and roots, and the overall tension forces in the chain and sprocket system. In another important aspect of the invention, three different root radii may be arranged in a pattern around the circumference of the sprocket. The use of three different root radii to vary the depth of the spaces between adjacent teeth may further reduce the sound frequencies and overall tension forces exerted on the system.

The root radii pattern according to the sprocket of another aspect of the invention also may be selected to redistribute the first, second, third, and fourth order tensions imparted to the chain by the sprocket to a fourth order of the sprocket revolution. In yet another aspect of the invention, a sprocket is provided that reduces chain tensions and chain noise, as compared to typical random sprockets designed principally for noise reduction.

In still another aspect of the invention, the maximum tensions imparted to the chain by the sprocket may be concentrated at the fourth order of the sprocket rotation. Accordingly, a peak in the chain tension imparted by the sprocket occurs four times for every rotation of the sprocket.

According to another aspect of the invention, the sprocket may be used in a chain and sprocket system where tension is imparted to the chain from sources external to the sprocket. When the maximum tensions imparted to the chain from sources external to the sprocket occur at generally predetermined orders of the sprocket rotation, the arrangement of the sprocket root radii may be selected to at least partially offset, disperse, compensate for, or add to the tensions imparted to the chain originating from external sources.

In another aspect of the invention, a random sprocket may comprise a plurality of different pitch radii, as measured from the center of the sprocket to a chain joint when the chain is seated in the sprocket. The plurality of different pitch radii may be arranged in a pattern effective to distribute chain tensions at one or more predetermined orders of the sprocket revolution, such as for silent chains wherein teeth of the chain contact teeth of the sprocket.

DETAILED DESCRIPTION

The invention in one important aspect is embodied in a random sprocket for use in an automotive chain and sprocket system, such as used in an engine timing system. In this aspect of the invention, the sprocket root radii and patterns are selected, and are effective, to redistribute chain tensions to one or more predetermined orders of the sprocket revolution. In another important aspect, the random sprocket has a plurality of different root radii arranged in a pattern effective to reduce tensions imparted to the chain by the sprocket. In yet another aspect, the root radii and pattern is selected to reduce tensions important to the chain and to reduce noise generated as the chain contacts the sprocket.

Figure 1:
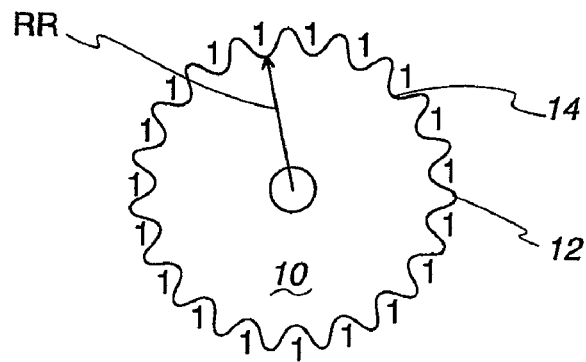
FIG. 1 is a side elevation view illustrating a straight sprocket according to the prior art.

FIG. 1 illustrates a typical prior art sprocket 10. The sprocket 10 has nineteen radially extending teeth 12 disposed about its circumference for engaging links 82 of a chain 80, such as the chain 80 illustrated in FIG. 8. Such sprockets 10 may have a variety of sizes, and, for example, may have an outer radius of approximately 3.0915 cm, as measured from the center of the sprocket 10 to tips of the teeth 12.

Sprocket roots 14 are defined between adjacent teeth 12 for receiving pins or rollers 84 that connect the links 82 of the chain 80. The roots 14 have a generally arcuate profile to facilitate engagement with the pins 84 of the chain. Each root 14 has a root radius RR, defined as the distance from the center of the sprocket 10 to a point along the root 14 closest to the sprocket center. In the illustrated sprocket 10, the root radius RR is approximately 2.57685 cm, as measured from the center of the sprocket 10 to the innermost point along the root 14. The sprocket 10 of FIG. 1 has all of its root radii RR equal to each other, and is generally known as a "straight" sprocket. Thus, the depths of each root 12 are the same, as indicated with reference numeral 1, corresponding to the first (and only) root radius RR for this type of sprocket 10.

Different tensioning events of the chain 80 may be repeated on a periodic basis during each rotation of the sprocket 10. As mentioned above, the number of times a given tensioning event is repeated in one rotation of the sprocket 10 may be referred to as an "order" relative to the sprocket 10 rotation. For example, a tensioning event of the chain 80 that occurs once during each rotation of the sprocket 10 may be termed a first order event, events occurring twice during one sprocket revolution may be termed second order events, etc.

When the tension in the chain 80 is observed during operation of the system, increases in the tension of the chain 80 may occur at certain orders of the sprocket 10 revolution. In a straight sprocket, such as the sprocket 10 of FIG. 1, the only significant peak in the chain tension may occur at the order of the sprocket 10 corresponding to the number of teeth 12 on the sprocket 10, also known as the pitch order as mentioned above.

Thus, a chain rotating about the sprocket 10, having nineteen teeth 12, will have a peak in the tension imparted to the chain 80 by the sprocket at the nineteenth order of the sprocket revolution, or nineteen times for every revolution of the sprocket 10. Peaks in the tension imparted to a chain 80 by a sprocket 10 may also be due to other factors besides the number of sprocket teeth 12. For example, a sprocket 10 that is not rotating about its exact center may impart a tension to the chain 80 at the first sprocket order, or once for every rotation of the sprocket 10, due to the eccentric rotation of the sprocket 10.

In order to reduce noise generated by contact between pins or rollers 84 of a chain 80, and roots 14 and teeth 12 of a sprocket 10, "random" sprockets have been developed with plurality of different root radii. For example, a random sprocket may have two different root radii arranged in a predetermined pattern selected to decrease noise. A random sprocket may also be designed to incorporate three different root radii arranged in a predetermined pattern to further reduce noise generated by engagement of the chain 80 with the sprocket. The root radii may vary based on the particular system and sprocket design.

Example 1

Figure 2:
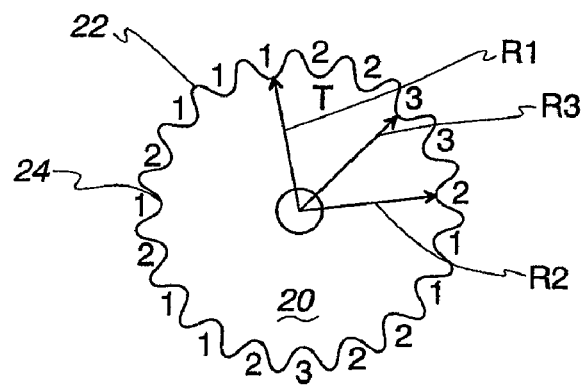
FIG. 2 is a side elevation view illustrating a random sprocket according to the prior art.

The random sprocket 20 illustrated in FIG. 2 is designed to reduce noise generated by engagement of the chain 80 with the sprocket 20. The random sprocket 20 is similar to the straight sprocket 10 of FIG. 1, but has three different root radii R1, R2, and R3 and thus three different root depths 1-3. In the sprocket 20 illustrated in FIG. 2, the first root radii R1 is approximately 2.54685 cm, the second root radii R2 is approximately 2.57685 cm, and the third root radii R3 is approximately 2.60685 cm, as measured from the center of the sprocket 20 to the innermost points of the roots 24.

The root depths 1-3 are arranged in a pattern selected to modulate the engagement frequency between the pins 84 of the chain 80 and roots 24 between adjacent teeth 22 of the sprocket 20 in order to reduce noise generation. As the pins 84 of the chain 80 move between adjacent roots 24 of the sprocket 22, the radial position at which the pins 84 seat varies between a maximum radius, a nominal radius, and a minimum radius. In the noise reducing sprocket 20 of FIG. 2, the pattern of root 24 depths, beginning at the timing mark T, is 2, 2, 3, 3, 2, 1, 1, 2, 2, 3, 2, 1, 1, 2, 1, 2, 1, 1, 1.

Figure 5:
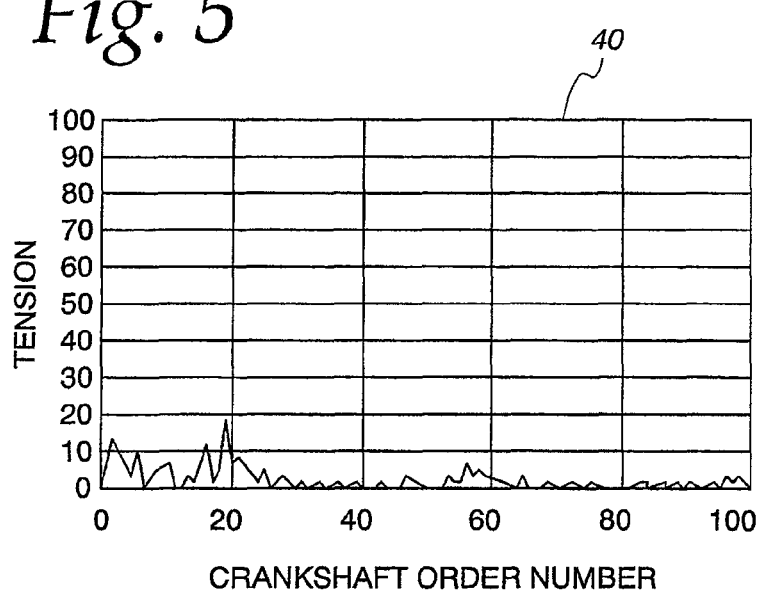
FIG. 5 is a graph comparing the maximum chain tensions occurring at orders relative to a sprocket revolution with the sprocket orders using the prior art random sprocket shown in FIG. 1.

The sprocket 20 was mounted on a shaft and used to drive a chain 80. A tension measuring device was placed in contact with the chain 80 to measure the tension as the chain 80 was driven by the sprocket 20. FIG. 5 includes a chart 40 comparing maximum chain tensions with corresponding orders of the rotation of the shaft on which the random sprocket 20 of FIG. 2 was mounted. Thus, in this example, the rotational speed of the sprocket 10 is the same as the rotational speed of the shaft, and the sprocket 20 therefore has the same relative order numbers as the shaft. If the sprocket under consideration is a driven sprocket, the rotational speed and orders relative to the shaft may differ from the example, depending upon the size of the driven sprocket and the relative number of rotations the driven sprocket makes compared to the driving sprocket 20.

FIG. 5 should be read in conjunction with Table 1 set forth below which lists the maximum chain tensions corresponding to the first nineteen orders of the revolution of the shaft and random sprocket 20. As shown in FIG. 5 and Table 1, the greatest chain tensions occur at the sixteenth and nineteenth orders, but the lowest sprocket orders also have relatively high corresponding maximum chain tensions. For example, the first, second, third, and fourth sprocket orders have corresponding chain tensions which are considerably greater than the chain tensions occurring at the fifth through thirteenth orders of the sprocket.

TABLE 1

| Order | Tension |
|---|---|
| 1.000 | 10.848 |
| 2.000 | 12.672 |
| 3.000 | 9.553 |
| 4.000 | 6.629 |
| 5.000 | 2.080 |
| 6.000 | 9.878 |
| 7.000 | 0.423 |
| 8.000 | 3.852 |
| 9.000 | 5.208 |
| 10.000 | 6.331 |
| 11.000 | 0.138 |
| 12.000 | 0.124 |

TABLE 1-continued

| Order | Tension |
|---|---|
| 13.000 | 3.239 |
| 14.000 | 4.323 |
| 15.000 | 1.285 |
| 16.000 | 12.217 |
| 17.000 | 0.820 |
| 18.000 | 4.037 |
| 19.000 | 18.271 |

Thus, in the random sprocket 20 having three different root radii arranged in pattern selected for noise reduction, illustrated in FIG. 2, the first, second, third, and fourth sprocket orders may impart relatively large tensions to the chain 80 as compared to the remaining sprocket orders. This increase in chain tensions corresponding to lower sprocket orders may have the undesirable effect of increasing the overall maximum chain tensions, creating an imbalance in chain tensions, and reducing the overall life of the chain and/or sprockets.

In order to reduce the chain tensions resulting from random sprockets such as in Example 1, the tensions imparted to the chain 80 by a sprocket utilizing one aspect of the invention may be redistributed among select sprocket orders or concentrated at a predetermined sprocket order. In this aspect, a plurality of different root radii are used and those root radii are arranged in one or more patterns that are effective to redistribute chain tensions occurring at one or more sprocket orders to other sprocket orders. The root radii and patterns also may be selected to reduce chain noise or whine without the disadvantages of random sprockets such as those discussed above and in Example 1.

In this aspect, the sprocket root radii are selected relative to a maximum radius and a minimum root radius as determined from the chain link size and configuration; the chain connecting pin size and spacing; and/or the number of sprocket teeth, tooth configuration and sprockets size. The root radii also may be selected relative to a nominal root radius which typically is the mid-point between the maximum and minimum root radii, and often is analogous to the root radii selected for a similar straight sprocket.

The selection of varying root radii allows for the distribution of the pitch tensions generated by the chain to sprocket tooth/root contact. It is believed that this is due to the contact of the chain pins (or equivalent chain elements) with the sprocket teeth/roots at different times and at different tension levels as a result of the varying depths of the sprocket roots.

The root radii further are arranged in a pattern that repeats around the sprocket circumference. This pattern typically includes one or more sets or multiple, non-uniform or random root radii. Each set typically includes the same number of root radii having the same length and arranged in the same order. Different sets of root radii may have radii of different lengths, number and arrangement.

The use of such patterns of sets of otherwise random root radii repeated along the circumference of the sprocket permits the shifting of those tensions to specific sprocket orders (or other orders based on the applicable reference). In doing so, the cumulative effect of shifting the tension forces permits the planned reduction or increase in the amount of chain tension is incorporated to the system by the sprocket at specific sprocket orders (or other reference orders).

The selection of the patterns of non-uniform or random root radii, and the lengths of those radii further permits the use of major and minor patterns or sub-patterns of root radii. Such major and minor patterns are effective to redistribute the tensions imparted to the chain (and overall system) to multiple sprocket orders (or other applicable orders) and at different magnitudes. This provides the additional flexibility in the selection of the sprocket root radii and patterns to offset multiple tension sources in the system and/or to balance the overall tensions on the chain and sprocket regardless of other sources of the tensional forces.

Moreover, the selection of such root radii and patterns permits the design of a sprocket and chain system that provides reduced levels of chain noise with the proper selection of the root radii within a set of radii, without unduly increasing overall chain or system tensions. Similarly, such a design is capable of providing reduced chain noise life and durability of the chain and a balance of tensional forces extending the sprocket system.

The following Example 2 illustrates several important aspects of the invention. Other variations and applications of the invention also are discussed below.

Example 2

Figure 3:
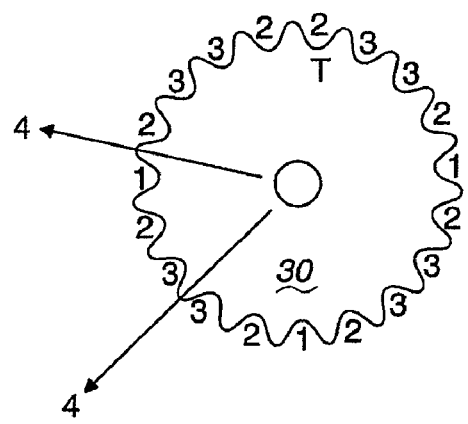
FIG. 3 is a side elevation view illustrating a random sprocket according to one aspect of the invention.

FIG. 3 illustrates a sprocket 30 according to an aspect of the invention wherein a random sprocket 30 is provided for both redistributing chain tensions at a predetermined sprocket orders and reducing noise generated by engagement of the chain 80 with the sprocket 30. Similar to the straight sprocket 10 of FIG. 1 and the random sprocket 20 designed principally for noise reduction of FIG. 2, the sprocket 30 has a plurality of radially extending teeth 32 disposed about its circumference for engaging the pins 84 of the chain 80. Roots 34 are defined between adjacent teeth 32 for receiving the pins 84 that connect the links 82 of the chain 80.

The sprocket 30 of FIG. 3 has a maximum root radius R3, a nominal root radius R2, and a minimum root radius R1. As mentioned above, the maximum and minimum root radii are dependent on the link size and pin spacing, the shape of the sprocket teeth, etc. The root pattern of the sprocket 30 of FIG. 3 is different from the root pattern of the sprocket 20 of FIG. 2.

As illustrated in FIG. 3, sprocket 30 was prepared with root radii R1, R2, and R3 of approximately 2.54685 cm, 2.57685 cm, and approximately 2.60685 cm, respectively. The pattern of root depths, beginning at the timing mark T, is 2, 3, 3, 2, 1, 2, 3, 3, 2, 1, 2, 3, 3, 2, 1, 2, 3, 3, 2. The root radii pattern of the sprocket 30 contains a sequence, i.e., 2, 3, 3, 2, 1, that is substantially repeated four times around the circumference of the sprocket 30.

Thus, the use of a random pattern of root radii grouped in sets of radii in this example provide a repeating pattern which may be used to effectively shift and concentrate the lower order tensions of the chain 80 at the fourth order of the sprocket 30, thereby reducing the overall maximum tensions imparted to the chain 80 by the sprocket 30. Such use of a combination of random root radii and repeating root radii patterns that shifts tensions imparted to the chain 80 by the sprocket 30 also provides benefits in that the overall maximum chain tensions may be reduced, while also reducing chain noise or whine.

Figure 4:
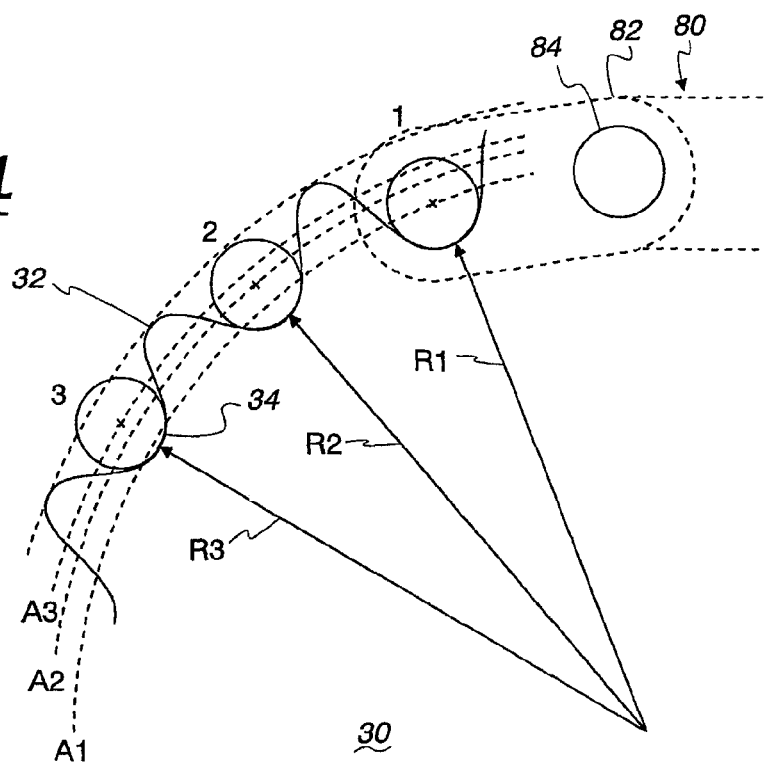
FIG. 4 is a detail view of section 4-4 of FIG. 3 showing pins of a chain in sprocket roots.

As illustrated in FIG. 4, showing a detailed view of a portion of the sprocket 30 of FIG. 3, the sprocket has three different root radii R1, R2, and R3, and thus three different root depths 1-3. FIG. 4 also shows arcs A1, A2, and A3 through the centers of chain pins 84 that correspond to the maximum seating radius R3, the minimum seating radius R1 and the nominal seating radius R2. The different root depths 1-3 are arranged in a pattern about the circumference of the sprocket 30 that is selected to concentrate the tensions imparted to the chain 80 by the sprocket 30 at a predetermined sprocket order.

The arrangement of the root radii may be selected by substantially repeating the root radii pattern a number of times equal to the sprocket order at which it is desired to concentrate the chain tensions. For instance, to concentrate the tensions imparted to the chain 80 by the sprocket 30 of the invention at the fourth sprocket order, the arrangement of the root radii may comprise a pattern that substantially repeats four times around the sprocket 30.

Figure 6:
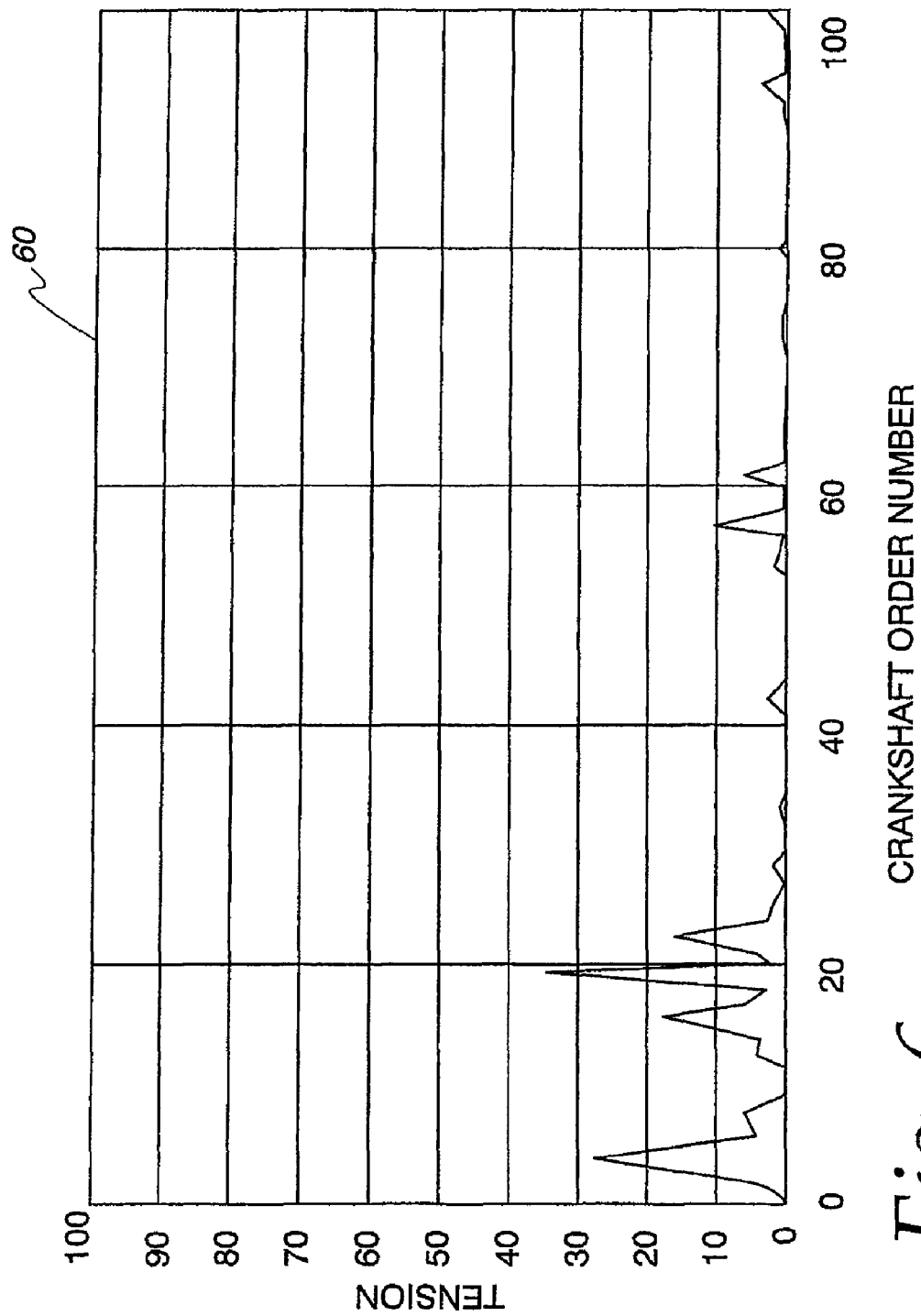
FIG. 6 is a graph illustrating the maximum chain tensions occurring at selected orders relative to a sprocket revolution using the random sprocket of the invention shown in FIG. 3.

FIG. 6 should be read in conjunction with Table 2 set forth below, and which is similar to Table 1, comparing the expected maximum chain tensions with corresponding orders of the revolution of a shaft on which the random sprocket 30 is mounted. Thus, the orders of the sprocket 30 directly correspond to the orders of the shaft. In Table 2, the maximum chain tensions expected to correspond to the first nineteen orders of the sprocket revolution are listed.

TABLE 2

| Order | Tension |
|---|---|
| 1.000 | 2.605 |
| 2.000 | 3.386 |
| 3.000 | 6.734 |
| 4.000 | 26.135 |
| 5.000 | 4.600 |
| 6.000 | 3.017 |
| 7.000 | 3.750 |
| 8.000 | 2.909 |
| 9.000 | 0.607 |
| 10.000 | 0.273 |
| 11.000 | 1.367 |
| 12.000 | 3.043 |
| 13.000 | 2.282 |
| 14.000 | 3.063 |
| 15.000 | 16.583 |
| 16.000 | 4.926 |
| 17.000 | 2.764 |
| 18.000 | 2.283 |
| 19.000 | 32.418 |

As shown in the chart 60 and Table 2, the sprocket 30 of FIG. 3 is expected to have reduced chain tensions corresponding to the lower sprocket orders, as compared to the lower orders of the sprocket 20 of FIG. 2, as shown in chart 52 of FIG. 5. Unlike the sprocket 20 of FIG. 2 designed only for noise reduction, the sprocket 30 of FIG. 3 is configured to concentrate the maximum chain tensions at the fourth and nineteenth orders of the sprocket revolution, while reducing the maximum chain tensions corresponding to the lower sprocket orders.

For example, the first, second, and third sprocket orders for the sprocket 30 of FIG. 3 are expected to have corresponding chain tensions reduced by about 76%, 73%, and 30%, respectively, as compared to the sprocket 20 of FIG. 2. The sprocket 30 redistributes those tensions from the lower orders to the fourth order, which is expected to have a corresponding maximum chain tension nearly 400% larger than the random sprocket 20 of FIG. 2, designed principally for noise reduction.

Figure 7:
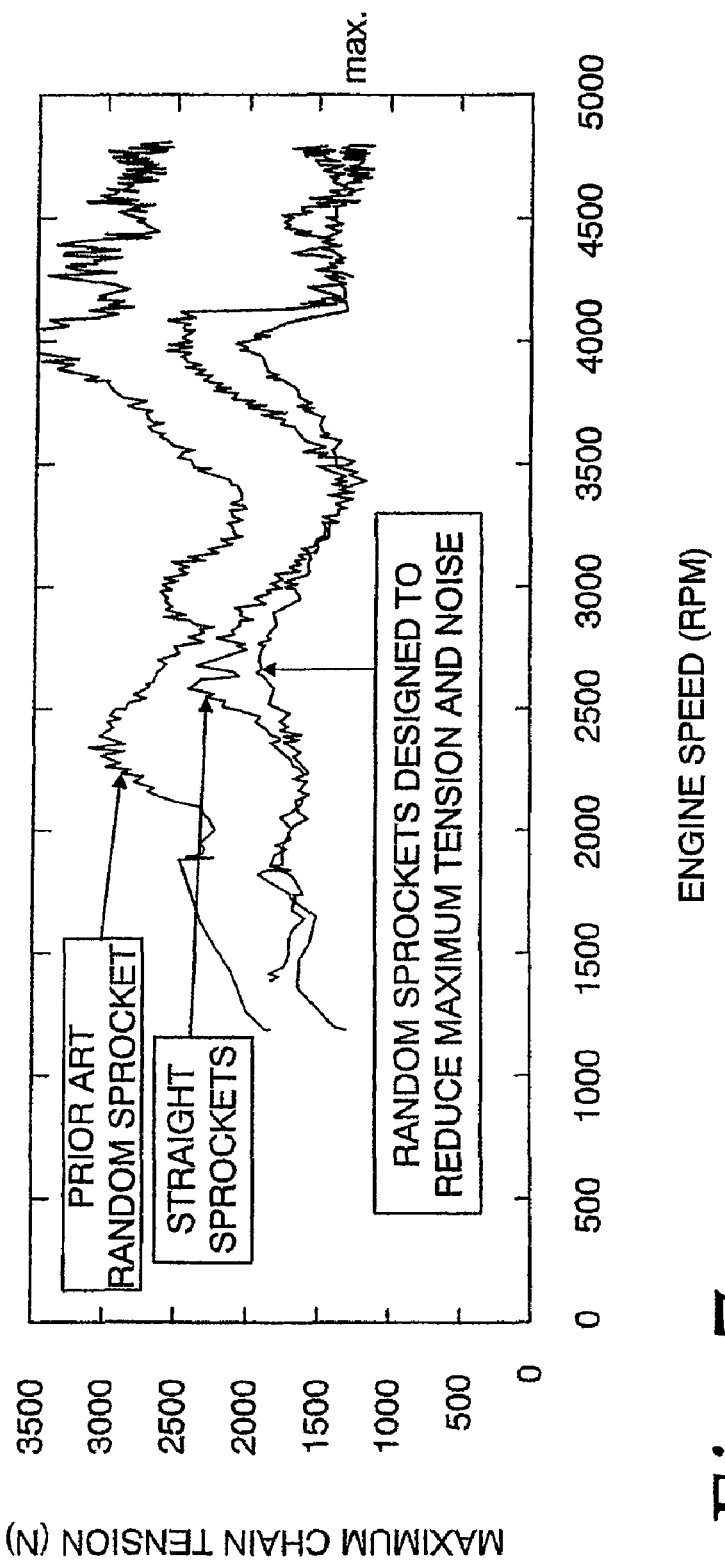
FIG. 7 is a graph comparing the maximum chain tensions of the sprockets of FIGS. 1-3 with the speed of an engine.

As mentioned above, the random and repeating root radii pattern can provide the benefit of reducing the overall maximum tensions imparted to the chain 80 by the sprocket 30, while also reducing noise generated by contact between the sprocket 30 and the chain 80. The expected overall maximum tension reducing effects of the random sprocket 30 of the invention are illustrated in FIG. 7. The maximum tensions expected to be imparted to a chain by the sprockets 10, 20, and 30 of FIGS. 1-3 are compared with corresponding engine speeds in FIG. 7.

As illustrated in FIG. 7, the straight sprocket 10 of FIG. 1 imparts significantly lower maximum tensions to the chain 80 throughout the various engine speeds relative to a random sprocket 20 designed only for noise reduction. In particular, it is expected that the maximum tensions imparted to the chain 80 by the random sprocket 20, designed principally for noise reduction, are higher near engine speeds of 4000 rpm, while the straight sprocket 10 would impart much lower maximum tensions to the chain for the same engine speed.

The maximum tensions imparted to the chain 80 by the random sprocket 30 designed for both noise reduction and reduced maximum chain tensions are expected to be significantly lower than for the random sprocket 20 designed principally to reduce noise. In fact, the tension reducing sprocket 30 may impart comparable, and in some instances, lower maximum tensions to the chain 80 than the straight sprocket 10 at engine speeds reflected in FIG. 7. Thus, FIG. 7 illustrates that the improved random sprocket design 30 of the invention is expected to provide for reduction of maximum overall chain tensions, an effect that is not available with prior random sprocket designs.

Although the fourth order was selected in the aspect of the invention illustrated in FIG. 3, chain tensions may also be concentrated at other orders of the sprocket revolution. For example, a root radii pattern may be selected that is effective to concentrate chain tensions at the third order of the sprocket revolution. Such a pattern may include a root radii sequence that is substantially repeated three times around the circumference of the sprocket. For example, a root depth pattern for concentrating chain tensions at the third sprocket order may be 1, 2, 3, 3, 3, 2, 1, 2, 3, 3, 3, 2, 1, 2, 3, 3, 3, 2, 1, where a root depth pattern, i.e., 1, 2, 3, 3, 3, 2, 1, is substantially repeated three times for each revolution of the sprocket.

In addition, the tensions imparted to the chain 80 by the sprocket may be concentrated at more than one sprocket order. For example, a root radii pattern may be selected that has a major root radii sequence repeating twice for each revolution of the sprocket and a minor sequence that repeats twice within each major sequence. Thus, in this aspect of the invention, the major and minor radii are provided by having the minor pattern repeating within the major repeating pattern. A benefit of having both major and minor repeating patterns is the ability to further redistribute the sprocket orders at which tensions imparted to the chain 80 by the sprocket occur.

Thus, for every revolution of a sprocket having such a pattern, the major root radii sequence may impart two tensioning events, while the minor root radii sequence may impart four tensioning events. The tensioning events imparted by the minor root radii sequence may be of a lesser magnitude than the tensioning events imparted by the major root radii sequence.

Chain tensions, in addition, may be imparted to the chain 80 by various parts of the automotive engine system external to the sprockets, such as the shaft, the pistons, and/or chain tensioners. Chain tensions further may vary according to the operating temperature of the system. For example, when the ambient temperature of the engine decreases, the chain 80 may tend to cool and then contract, resulting in an increased chain tension. Conversely, when the ambient temperature of the engine increase, the chain 80 may tend to expand, thereby decreasing the tension in the chain 80. These external sources may impart tension events to the chain 80 in addition to those imparted to the chain 80 by the sprockets 20 and 30 of the above examples. These external tensioning events may occur at intervals that correspond to orders of the sprocket revolution.

In order to reduce overall chain tensions in the chain and sprocket system, the tensions imparted to the chain 80 by the improved random and repeating root radii pattern of the invention, such as those of sprocket 30, may be selected to at least partially offset tensions imposed on the chain 80 by such sources external to the sprocket 30 and chain 80. In one aspect of the invention, the orders of the sprocket revolution corresponding to peaks in the chain tension due to external sources, as well as those due to the sprocket 30, are determined. The sprocket 30 is then configured to concentrate chain tensions at a sprocket order at which the chain tensions due to external sources are at a minimum. This provides the potential to reduce the overall tensions in the chain 80, such as may occur if both the chain tension due to the sprocket 30 and the chain tension due to external sources are at their maximums.

In another aspect of the invention, the sprocket 30 is configured to impart maximum tensions to the chain 80 at orders that add to tensions imparted by external sources. This provides the ability to concentrate the maximum chain tensions due to both the sprocket 30 and the external sources at a predetermined sprocket order.

For example, when the external tensions occur four times for every rotation of the sprocket 30, the root radii of the sprocket 30 may be arranged to concentrate the maximum tensions imparted to the chain 80 by the sprocket 30 at sprocket orders phased to at least partially cancel the external tensions imparted to the chain. In this manner, the external tensions in the chain 80 may be at least partially offset by the sprocket tensions in the chain 80 to reduce the overall tension in the chain 80 and increase the life cycle of both the chain 80 and the sprocket 30.

In another aspect of the invention, the sprocket 30 is configured to impart increased chain tensions at one or more predetermined orders to generate low order tension fluctuations. The low order fluctuations may be used to help actuate a variable cam timing unit.

Figure 8:
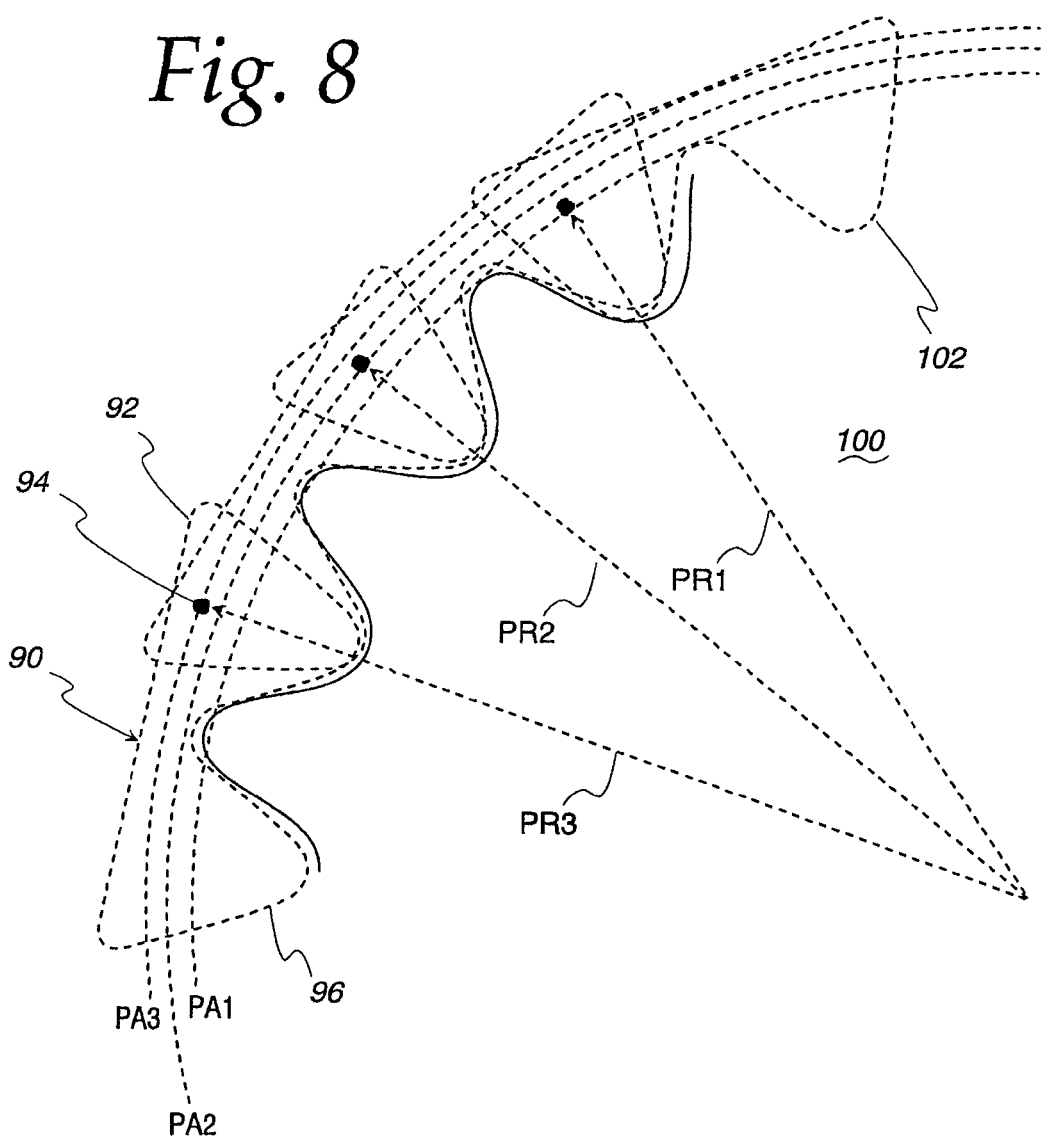
FIG. 8 is a detail view of a sprocket showing the teeth of a chain between adjacent sprocket teeth.

FIG. 8 illustrates a sprocket 100 according to an aspect of the invention for use with a silent chain 90. The silent chain 90 comprises a plurality of link plates 92, each having one or more teeth 96, pivotable relative to each other about joints 94. As the silent chain 90 rotates around the sprocket 100, the teeth 96 of the chain 90 engage teeth 102 of the sprocket 100. The sprocket 100 has three different pitch radii PR1, PR2, and PR3, as measured from the center of the sprocket 100 to joints 94 between link plates 92 having teeth 96 seated between teeth 102 of the sprocket 100. FIG. 8 illustrates arcs PA1, PA2, and PA3 through the centers of chain joints 94 that correspond to the pitch radii R1, R2 and R3. The pitch radii PR1, PR2, and PR3 are arranged in a pattern effective to distribute tensions imparted to the chain 90 by the sprocket 100 at one or more predetermined orders of the revolution of the sprocket 100.

From the foregoing, it will be appreciated that the invention provides a method and apparatus for reducing noise generated by the engagement between a chain and a sprocket, while reducing the tensions imparted to the chain by the sprocket. While the figures are illustrative of aspects of the invention, the invention is not limited to the aspects illustrated in the figures. Furthermore, the invention is not limited to the aspects described herein above or to any particular aspects.

The invention is defined more particularly by the following claims:

1. A sprocket comprising: a central axis of rotation and a plurality of teeth with sprocket engagement surfaces, the sprocket teeth and the sprocket engagement surfaces spaced about the periphery of the sprocket,
   the sprocket engagement surfaces disposed to engage surfaces of chain link teeth of a chain having a plurality of links interconnected at joints having a central pin axis;
   the sprocket engagement surfaces spaced a distance from the sprocket central axis to dispose the chain at a pitch radius defined by the distance between the sprocket central axis and the pin axis of the chain links engaged by the sprocket engagement surfaces;
   the sprocket engagement surfaces disposed to engage the chain to provide a sequence of a minimum pitch radius, a maximum pitch radius, and at least one intermediate pitch radii therebetween; and
   a pitch radii sequence including the minimum pitch radius, the maximum pitch radius and at least one intermediate pitch radius substantially repeating itself at least twice with each rotation of the sprocket for imparting tensions to the chain timed with respect to tension loads imparted to the system from other sources effective to reduce maximum chain tensions at one or more peak tension speeds relative to the maximum chain tensions at the peak tension speeds where the sprocket is a straight sprocket.

2. The sprocket of claim 1 wherein the sequence substantially repeats at least three times with each rotation of the sprocket.

3. The sprocket of claim 2 wherein the pitch radii sequence and timing of the tensions provided by the pitch radii are effective to reduce maximum chain tensions during operation of the sprocket when operated with a chain at resonance conditions relative to where the sprocket is a straight sprocket operated with a chain operating at resonance conditions.

4. The sprocket of claim 1 wherein the sequence substantially repeats at least four times with each rotation of the sprocket.

5. The sprocket of claim 1 wherein the sprocket engagement surfaces maintain the distance between adjacent pin axes of links engaged with the sprocket substantially constant.

6. The sprocket of claim 1 wherein the pitch radii sequence includes at least one full sequence of pitch radii and a less than full sequence of pitch radii, the less than full sequence having at least one pitch radius, which is in the full sequence missing from the less than full sequence.

7. The sprocket of claim 1 wherein the pitch radii sequence includes a plurality of full sequences of pitch radii, and at least one additional pitch radius between an end of a last repeating full sequence and a beginning of a first repeating full sequence.

8. A chain and sprocket drive system comprising:
   a chain having a plurality of pairs of links being interconnected by pins;
   one or more generally circular sprockets with a central axis of rotation and a plurality of teeth spaced about the periphery of the sprocket with sprocket engagement surfaces disposed to engage surfaces of chain link teeth of the chain, the sprocket engagement surfaces spaced a distance between the sprocket central axis to dispose the chain at a pitch radius defined by the distance between the sprocket central axis and the pin axis of the chain links engaged by the sprocket engagement surfaces;
   the sprocket engagement surfaces arranged to provide a sequence of a minimum pitch radius, a maximum pitch radius, and at least one intermediate pitch radius therebetween; and a pitch radii sequence substantially repeating itself at least twice with each rotation of the sprocket imparting tensions to the chain timed with respect to tension loads imparted to the system from other sources effective to reduce maximum chain tensions at one or more peak tension speeds relative to the maximum chain tensions at the peak tension speeds where the sprocket is a straight sprocket.

9. The system of claim 8 wherein the sequence substantially repeats at least three times with each rotation of the sprocket.

10. The system of claim 8 wherein the pitch radii sequence and timing of the tensions provided by the pitch radii are effective to reduce maximum chain tensions during operation of the sprocket when operated with a chain at resonance conditions relative to where the sprocket is a straight sprocket operated with a chain operating at resonance conditions.

11. The system of claim 8 wherein the sequence substantially repeats at least four times with each rotation of the sprocket.

12. The system of claim 8 wherein the sequence of pitch feet radii sequence includes at least one full sequence of pitch radii and a less than full sequence of pitch radii, the less than full sequence having at least one pitch radius, which is in the full sequence missing from the less than full sequence.

13. The system of claim 8 wherein the pitch radii sequence includes a plurality of full sequences of pitch radii, and at least one additional pitch radius between an end of a last repeating full sequence and a beginning of a first repeating full sequence.

14. A method of distributing tensions imparted to a chain having links looped around a sprocket, the chain and sprocket operating at variable speeds, the method comprising:
providing a sprocket having a central axis, a plurality of sprocket teeth and a plurality of sprocket engagement surfaces, the sprocket engagement surfaces spaced at a distance from the central axis to dispose the chain at a pitch radius defined by the distance between the sprocket central axis and a pin axis of a chain link engaged by the sprocket engagement surfaces;
arranging the sprocket engagement surfaces such that the sprocket engagement surfaces engage the chain to provide a sequence of a minimum pitch radius, a maximum pitch radius and at least one intermediate pitch radius therebetween; and
wherein the sequence of pitch radii are selected to provide a sequence that substantially repeats at least two times for distributing the tensions imparted to the chain and sprocket system reducing maximum tension forces exerted on the chain relative to maximum tension forces in a chain and sprocket system where the sprocket is a straight sprocket.

15. The method according to claim 14, wherein the sequence substantially repeats at least three times.

16. The method according to claim 14 wherein the sequence of pitch radii are selected to include at least one major sequence and at least one minor sequence.

17. The method according to claim 14, further comprising selecting the sequence of pitch radii effective to at least partially offset tensions imparted to the chain by sources other than the sprocket to balance the overall tension force imparted to the system by all tension sources.

18. The method according to claim 14, wherein the sequence substantially repeats at least four times.

19. The method of claim 14 wherein the sequence of pitch radii and timing of the tensions provided by the pitch radii are effective to reduce maximum chain tensions during operation of the sprocket when operated with a chain at resonance conditions relative to where the sprocket is a straight sprocket operated with a chain operating at resonance conditions.

20. The method of claim 14 wherein the sequence of pitch radii and timing of the tensions provided by the pitch radii are selected to reduce maximum chain tensions during operation of the sprocket when operated with a chain at resonance conditions relative to where the sprocket is a straight sprocket operated with a chain operating at resonance conditions.

21. The method of claim 14 wherein the sequence of pitch radii includes a full sequence of pitch radii and a less than full sequence of pitch radii, the less than full sequence having at least one pitch radius, which is in the full sequence missing from the less than full sequence.

22. The method of claim 14 wherein the sequence of pitch radii includes a plurality of full sequences of pitch radii, and at least one additional pitch radius between an end of a last repeating full sequence and a beginning of a first repeating full sequence.

* * * * *